UNITED STATES PATENT OFFICE 2,569,549

IMIDOHALIDES AND PROCESS OF PREPARING THEM AND THEIR HYDROLYSIS PRODUCTS

Paul L. Barrick, Boulder, Colo., assignor to E. I. du Pont de Nemours & Company, Wilmington, Del., a corporation of Delaware No Drawing. Application March 21, 1949, Serial No. 82,697

9 Claims. (Cl. 260—543)

This invention relates to organic compounds containing halogen and nitrogen. More particularly, it relates to beta-haloamines, their N-acyl derivatives and imidohalides, and to a new method of preparing these compounds.

This application is a continuation in part of my application Serial No. 777,126 filed September 30, 1947, now abandoned.

There is no known convenient or economical method of preparing the N-acyl derivatives of aliphatic beta-haloamines, which compounds have the general formula

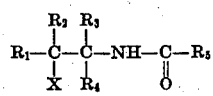

wherein $R_1$ to $R_4$ are hydrogen or hydrocarbon, X is chlorine or bromine and $R_5$ is hydrocarbon or halohydrocarbon. Neither is there any known convenient or economical method of preparing the corresponding aliphatic beta-haloamines which compounds have the general formula

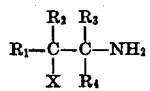

wherein $R_1$ to $R_4$ are hydrogen or hydrocarbon and X is chlorine or bromine.

It has now been discovered that the N-acyl derivatives of aliphatic beta-haloamines and corresponding aliphatic beta-haloamines can be obtained through hydrolysis of their imidohalides. However, these imidohalides are not obtainable by any published general method. [Von Braun, Ber. 38, 2340 (1905); Von Braun, Angew. Chemie, 47, 611 (1934).]

It is an object of this invention to provide a general method of preparing the imidohalides of N-acyl-beta-haloamines. Another object is to provide a convenient and economical method of preparing N-acyl-beta-haloamines and beta-haloamines. A further object is to provide a new class of chemical compounds, the imidohalides of certain N-acyl-beta-haloamines. Other objects will appear hereinafter.

These objects are accomplished by the method of preparing the imidohalides of N-acyl-beta-haloamines which comprises halogenating an ethylenically unsaturated hydrocarbon containing from two to twelve carbon atoms with a halogen having an atomic number from 17 to 35 in contact with a nitrile which is present in an amount of at least one mole per mole of said ethylenically unsaturated hydrocarbon. The hydrolysis products are obtained by hydrolyzing the resulting imidohalide under neutral to acidic conditions to the corresponding N-acyl-beta-haloamine and beta-haloamine. It has now been discovered that N-acyl-beta-haloamines and beta-haloamines can be obtained readily and economically using as intermediates the imidohalides of aliphatic N-acyl-beta-haloamines, which are prepared by the new method described herein.

The imidohalides of N-acyl-beta-haloamines which are a new class of chemical compounds are characterized by (a) the alpha carbon of the acyl group having its remaining three valences attached solely to chlorine or bromine, alkyl groups of one to six carbon atoms, chloro- or bromoalkyl groups of one to six carbon atoms, or cycloalkyl groups of five to six carbon atoms (b) the amine portion of the molecule containing besides the nitrogen and halogen atoms, only carbon and hydrogen, having from two to twelve carbon atoms, and having the nitrogen and halogen atoms both attached to adjacent aliphatic carbon atoms. These new products have the general formula

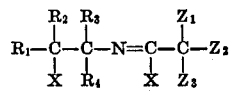

wherein the R's are hydrogen or hydrocarbon radicals which taken together have a total of one to ten carbon atoms, two of which R's may form, together with the carbon atoms attached to the nitrogen and halogen, a five- to six-membered carbon alicyclic ring; X represents a halogen of atomic number from 17 to 35, i. e., chlorine or bromine; and the Z's are halogens of atomic number from 17 to 35, alkyl groups of one to six carbon atoms, chloroalkyl or bromoalkyl groups of one to six carbon atoms or cycloalkyl groups of five to six carbon atoms, and two of the Z's may be joined in a five to six carbon cycloalkyl ring.

The process of this invention is illustrated by the following set of equations, where the ethylenically unsaturated compound is shown in skeleton form:

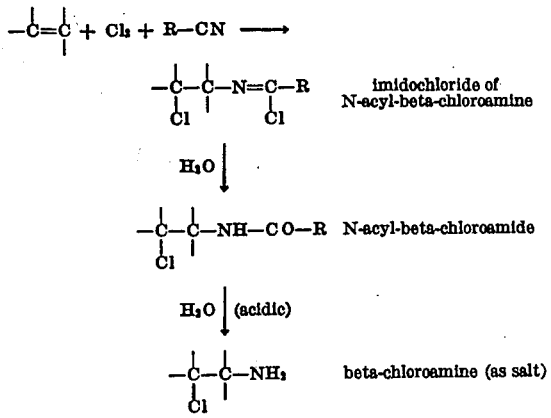

In some cases, as will be apparent from the examples which follow, there is simultaneous substitution halogenation of the nitrile, affecting the carbon atom alpha to the nitrile carbon, or addition halogenation if an unsaturated nitrile is used, or both.

Some of the primary products of this process, i. e., the imidohalides, are stable only in solution or at low or moderate temperatures. However, certain of these imidohalides are stable and can be isolated and stored. Examples of such stable imidohalides are those having the formula

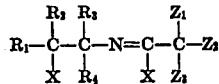

wherein the R's, X's and Z's have the significance herein specified. These stable imidohalides are new and are included within the present invention.

The invention is illustrated in greater detail in the following examples, wherein parts are by weight.

*Example I*

A solution of 16 parts of chlorine in 65 parts of acetonitrile was cooled in an ice bath and treated with a slow stream of ethylene for a few minutes. The solution still had a slight yellow color, indicating that there was still chlorine present. After removal of the excess acetonitrile, there remained 8.2 parts of a colorless oil which did not crystallize and could not be purified by distillation. Hydrolysis of this product with warm water gave a colorless solid which, after recrystallization from water, melted at 77–79° C. This was N-(beta-chloroethyl)-trichloroacetamide,

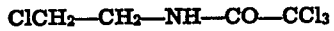

obtained by hydrolysis of the intermediate N-[(alpha-chloro-beta, beta, beta-trichloro)ethylidene]-beta-chloroethylamine (the imidochloride of N-(beta-chloroethyl) trichloroacetamide).

Anal.: Calculated for $C_4H_5ONCl_4$: C, 21.3; H, 2.22; N, 6.22; Cl, 63.0. Found: C, 21.63; H, 2.37; N, 6.34; Cl, 62.0.

An authentic sample of N-(beta-chloroethyl)-trichloroacetamide was prepared by treating beta-chloroethylamine hydrochloride with trichloroacetyl chloride in dry dioxane in the presence of pyridine. The reaction product after recrystallization from 50% aqueous ethanol contained 62.81% chloride and melted at 77–78.5° C. A mixed melting point with the product prepared as described above showed no depression.

*Example II*

When the above reaction was repeated using a large excess of chlorine, a stable imidochloride was obtained as follows:

Into 82 parts (2 moles) of acetonitrile at 15° C. chlorine and ethylene were introduced simultaneously and with rapid stirring by means of two inlet tubes below the surface of the acetonitrile. Two and one-half hours were required for the introduction of 1.08 moles of ethylene. Chlorine was introduced simultaneously during this time and for 4.5 hours longer. After the ethylene addition was complete, the reaction temperature was allowed to rise to 30–35° C. until a total of 360 parts of chlorine had been added. The reaction mixture was purged with nitrogen until no hydrogen chloride was evolved, and distilled. A small amount of low boiling material was obtained which consisted of acetonitrile and 1,2-dichloroethane. The main fraction consisted of 122 parts of a colorless liquid boiling at 71–73° C. at 3 mm. pressure, $n_D^{25}$ 1.5150, which was shown by analysis to be N-[(alpha-chloro-beta,-beta,beta-trichloro)ethylidene]-beta-chloroethylamine,

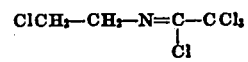

the imidochloride of N-(beta-chloroethyl)trichloroacetamide.

Anal.: Calculated for $C_4H_4NCl_5$: Cl, 72.87; N, 5.78. Found: Cl, 72.11; N, 5.83.

The imidochloride was hydrolyzed by heating 42 parts of it to reflux with 100 parts of water, 80 parts of methanol and 18 parts of concentrated hydrochloric acid for 2 hours. On cooling, there was obtained a white crystalline solid (82% conversion) melting at 76–76.5° C. which after crystallization from benzene was found to be identical with the N-(beta-chloroethyl) trichloroacetamide of Example I.

*Example III*

A solution of 15 parts (0.126 mole) of benzonitrile in 75 parts of chloroform was alternatively saturated with ethylene and chlorine at 10° C. until chlorine was no longer consumed. The mixture was then purged with nitrogen and the chloroform was evaporated. On cooling, 5.5 parts of a white solid was obtained and recrystallized from benzene. This was N-benzoyl-beta-chloroethylamine, $ClCH_2-CH_2-NH-CO-C_6H_5$, M. P. 104–105.5° C., obtained through hydrolysis of the intermediate imidochloride by the small amount of moisture present in the reaction mixture.

Anal.: Calculated for $C_9H_{10}ONCl$: Cl, 19.35; N, 7.13. Found: Cl, 19.33; N, 7.33.

*Example IV*

Chlorine and ethylene were introduced simultaneously into 125 parts (2.35 moles) of acrylonitrile at 15° C. Complete absorption of both gases occurred and after 1½ hours the reaction was stopped when 72 parts (1.02 moles) of chlorine and 18 parts (0.645 mole) of ethylene had been added. The mixture was purged with nitrogen and rectified. There was obtained 56 parts of a colorless liquid boiling at 94–95° C. at 4 mm. pressure, $n_D^{25}$ 1.5200, which was shown by analysis to be N-[(alpha-chloro-beta,beta-dichlorogamma,chloro)propylidene]-beta-chloroethylamine, or the imidochloride of N-(beta-chloroethyl)-alpha,alpha,beta-trichloro-propionamide,

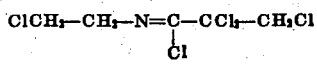

Anal.: Calculated for $C_5H_6NCl_5$: Cl, 68.93; N, 5.47. Found: Cl, 67.63; N, 5.60.

Example V

Chlorine (35 parts, 0.5 mole) was passed simultaneously with ethylene (18 parts, 0.64 mole) into 72 parts (0.87 mole) of stirred pivalonitrile, $(CH_3)_3C-CN$, at 10–15° C. in 1.5 hours. The resulting clear liquid was purged with nitrogen and rectified. After stripping off a foreshot consisting mostly of unreacted pivalonitrile and ethylene dichloride, 36 parts of a colorless liquid boiling at 57–58° C. at 6 mm. pressure was collected. This was shown by analysis to be N-[(alpha - chloro - beta,beta,beta - trimethyl)ethylidene]-beta-chloroethylamine, the imidochloride of N-(beta-chloroethyl) trimethylacetamide,

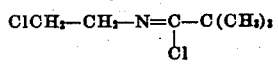

Anal.: Calculated for $C_7H_{13}NCl_2$: Cl, 39.01; N, 7.70. Found: Cl, 38.71; N, 7.99.

When 13.5 parts of the imidochloride was poured into 100 parts of water, an immediate reaction occurred and so much heat was evolved that it was necessary to cool the mixture by direct addition of ice. From the cold mixture separated 7.5 parts of N-(beta-chloroethyl) pivalamide, $ClCH_2CH_2NHCOC(CH_3)_3$, a solid melting at 162° C.

Anal.: Calculated for $C_7H_{14}ONCl$: Cl, 21.71; N, 8.57. Found: Cl, 21.13; N, 7.84.

Example VI

A solution of 32 parts of chlorine in 135 parts of acetonitrile cooled in an ice bath was treated with a slow stream of isobutylene until the yellow color disappeared. The excess acetonitrile was removed, leaving 21 parts of colorless oil ($n_D^{23.1}=1.5088$) which did not crystallize and could not be purified by distillation. On hydrolysis of this material with dilute hydrochloric acid there was obtained a low melting colorless solid, from which an oily constituent was removed by rubbing on a clay plate. The solid melted at 53–54° C., and analyzed for an N-(chloroisobutyl)trichloroacetamide. Although the respective positions of the chloro and the amido groups were not definitely established, it is probable that the material was N-[(beta-chloro-alpha,alpha-dimethyl)ethyl]trichloroacetamide,

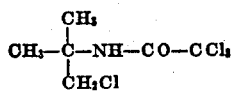

obtained by hydrolysis of the intermediate N-[(alpha - chloro - beta,beta,beta - trichloro) ethylidene] - (beta - chloro - alpha,alpha - dimethyl)-ethylamine.

Anal.: Calculated for $C_6H_9ONCl_4$: C, 28.4; H, 3.56; N, 5.53; Cl, 56.1. Found: C, 28.42; H, 3.51; N, 5.46; Cl, 55.6.

Example VII

A slow stream of gaseous butadiene was bubbled while stirring through 50 parts of acetonitrile cooled in an ice bath, while adding simultaneously a solution of 12.5 parts of chlorine in 50 parts of acetonitrile. The resulting colorless reaction mixture was evaporated to remove the excess acetonitrile. There remained 13.4 parts of a yellowish oily product which was treated with concentrated hydrochloric acid at 100° C. for about 5 hours. The resulting solution was cooled, neutralized with alkali and extracted with ether. The ether solution after drying over anhydrous sodium sulfate was treated with dry hydrogen chloride, which gave a light brown oil consisting essentially of the hydrochloride of a monochloro monoaminobutene, as indicated by its chlorine content of 47.1% and its nitrogen content of 8.73%.

Example VIII

Into a stirred mixture of 56 parts (0.5 mole) of octene-1 and 41 parts (1 mole) of acetonitrile was bubbled 55 parts (0.77 mole) of chlorine at 10–15° C. The resulting clear solution was poured into a mixture of ice and water, and this mixture was treated with 125 parts of concentrated hydrochloric acid and steam-distilled. The aqueous portion of the steam distillation residue was evaporated to dryness, leaving a solid amine hydrochloride which was recrystallized from a benzene-ethanol mixture. There was thus obtained 14 parts of crystalline material shown by analysis to be the hydrochloride of 1-hydroxymethyl-heptylamine,

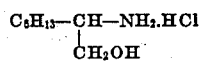

produced through complete hydrolysis of the intermediate imidochloride of N-[(alpha-hexyl-beta-chloro)ethyl]acetamide.

Anal.: Calculated for $C_8H_{20}ONCl$: Cl, 19.54; N, 7.72. Found: Cl, 20.31; N, 7.69.

Example IX

A solution of 14 parts of chlorine in 50 parts of acetonitrile was added with stirring to a mixture of 41 parts of cyclohexene and 41 parts of acetonitrile at ordinary temperature. At the end of the slightly exothermic reaction, the excess acetonitrile and cyclohexene was removed by evaporation at 100° C., leaving an oily residue which did not crystallize and could not be purified by distillation. This material was hydrolyzed by treatment with 100 parts of nearly boiling water for a few minutes, giving a colorless crystalline solid which, after recrystallization from aqueous alcohol, melted at 127–130° C. Analysis indicated that this compound was N-(2-chlorocyclohexyl)-acetamide,

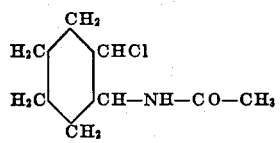

obtained by hydrolysis of the intermediate N-(alpha - chloro - ethylidene) - 2 - chlorocyclohexylamine, the imidochloride of N-(2-chlorocyclohexyl) acetamide.

Anal.: Calculated for $C_8H_{14}ONCl$: C, 54.7; H, 7.98; N, 7.98; Cl, 20.25. Found: C, 54.64; H, 8.05; N, 7.37; Cl, 20.3.

A sample (15 parts) of N-(2-chlorocyclohexyl) acetamide was heated with 100 parts of 3 N hydrochloric acid for 24 hours and the solution was evaporated to dryness. The residual solid was recrystallized from ethanol to give nearly the theoretical yield of 2-hydroxycyclohexylamine hydrochloride, M. P. 188–189° C.

Anal.: Calculated for C₆H₁₄ONCl: Cl, 23.43; N, 9.29. Found: Cl, 23.48; N, 9.26.

Example X

The presence of water, even in substantial amounts, is not detrimental to the process of chlorinating olefins in the presence of nitrile, as shown by the following experiment.

Chlorine gas was passed into a vigorously stirred mixture of 41 parts (0.5 mole) of cyclohexene, 21 parts (0.5 mole) of acetonitrile and 50 parts of water. A white solid separated as chlorine was passed into the stirred solution. After the theoretical amount of chlorine had been added, the mixture was poured onto cracked ice and filtered. This gave 16 parts N-(2-chlorocyclohexyl)-acetamide, melting at 129–130° C. after crystallization from methanol.

Anal.: Calculated for C₈H₁₄ONCl: Cl, 20.25; N, 7.98. Found: Cl, 20.10; N, 7.90.

The liquid by-product in this experiment consisted of 34 parts of dichlorocyclohexane, B. P. 94° C. at 44 mm. pressure, $n_D^{25}$ 1.4877.

Example XI

A mixture of 31 parts (0.3 mole) of benzonitrile and 16.4 parts (0.2 mole) of cyclohexene was treated with 15 parts (0.21 mole) of chlorine gas at 5° C. The reaction mixture was poured into water and steam-distilled to remove the unreacted benzonitrile. The residue was cooled rapidly and the solid which separated was filtered. Recrystallization of this solid from benzene gave 10 parts of N-(2-chlorocyclohexyl) benzamide,

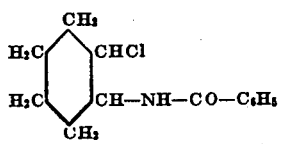

M. P. 165° C.

Anal.: Calculated for C₁₃H₁₆ONCl: Cl, 14.94; N, 5.89. Found: Cl, 15.01; N, 5.88.

Example XII

A mixture of 82 parts (1 mole) of cyclohexene and 84 parts (3.1 moles) of hydrogen cyanide was treated at 10° C. with 85 parts (1.2 moles) of chlorine gas while maintaining rapid stirring. The resulting mixture was poured onto ice and the organic layer was separated and washed several times with water. The remaining organic liquid was refluxed with 200 parts of 3 N hydrochloric acid for 12 hours. The mixture was then treated with 20 parts of methanol, refluxed 2 hours longer and steam-distilled. The non-steam volatile portion was filtered from about 2.5 parts of tarry material and evaporated to dryness. There was obtained 59 parts of 2-chlorocyclohexylamine hydrochloride, resulting from hydrolysis of the intermediate imidochloride of 2-chlorocyclohexyl formamide. Recrystallization of the product from ethanol gave the pure 2-chlorocyclohexylamine hydrochloride, M. P. 213–214° C.

Anal.: Calculated for C₆H₁₃NCl₂: Cl, 41.76; N, 8.24. Found: Cl, 41.42; N, 8.03.

Example XIII

A mixture of 20 parts (0.25 mole) of cyclohexene and 160 parts (3 moles) of acrylonitrile was treated with 58 parts (0.817 mole) of chlorine gas at 10–15° C., then purged with nitrogen. The reaction product was allowed to stand in contact with water for 60 hours, but no noticeable hydrolysis occurred. The mixture was then steam-distilled and the residual non-steam volatile organic material was separated and taken up in benzene. The benzene solution was dried over calcium sulfate and evaporated, leaving an oil which was treated with a little petroleum ether and cooled in a carbon dioxide-acetone bath. Crystallization took place, giving 11 parts of a white solid, melting at 90–100° C. This was shown by analysis to be N-(2'-chlorocyclohexyl)-1, 1, 2-trichloropropionamide,

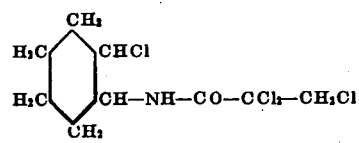

produced by hydrolysis of the intermediate imidochloride.

Anal.: Calculated for C₉H₁₃ONCl₄: Cl, 48.46; N, 4.80. Found: Cl, 48.50; N, 4.50.

Example XIV

Chlorine gas (46 parts, 0.65 mole) was passed into a stirred mixture of 89 parts (1.07 moles) of pivalonitrile and 62 parts (0.75 mole) of cyclohexene at 10–15° C. in 15 minutes. The resulting clear solution was poured into an ice-water mixture and stirred occasionally for 1 hour to promote hydrolysis. A white solid separated and the mixture was cooled again and filtered. There was obtained 67 parts of a white solid which was recrystallized from a benzenemethanol mixture to a melting point of 151° C. Analyses showed that this was N-(2-chlorocyclohexyl) trimethylacetamide,

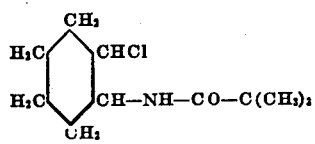

produced by hydrolysis of the intermediate imidochloride.

Anal.: Calculated for C₁₁H₂₀ONCl: Cl, 16.30; N, 6.44. Found: Cl, 16.22; N, 6.41.

Example XV

Chlorine gas (33 parts, 0.47 mole) was passed into a stirred solution of 41 parts (0.5 mole) of cyclohexene in 64 parts (0.75 mole) of acetone cyanohydrin at 10–15° C. in 45 minutes. The resulting clear solution was poured into an ice-water mixture and allowed to stand for 15 hours. The mixture was cooled again and the white solid which had separated was filtered and recrystallized from ethanol, giving 11 parts of a crystalline product melting at 147–147.5° C. This was shown by analysis to be N-(2-chlorocyclohexyl) dimethyl-hydroxyacetamide,

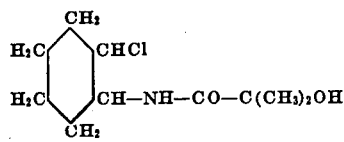

produced by hydrolysis of the intermediate imidochloride.

Anal.: Calculated for C₁₀H₁₈O₂NCl: Cl, 16.16; N, 6.38. Found: Cl, 16.68; N, 6.47.

Example XVI

Chlorine gas (27 parts, 0.38 mole) was bubbled into a stirred solution of 27 parts (0.2 mole) of dipentene and 125 parts (4.6 moles) of liquid hydrogen cyanide at 5° C. in 1 hour. The reaction mixture was poured into an ice-water mixture and the organic layer was separated and washed with water several times. The oil was then heated with 100 parts of 6 N hydrochloric acid at 100° C. and the resulting solution was evaporated to dryness. Final drying was achieved by adding benzene and distilling out a binary of water and benzene. The remaining tan-colored solid was purified by dissolving it in methanol, filtering the solution and reprecipitating the product by pouring the solution into a large volume of anhydrous ether. The solid reaction product had a melting range of 150–172° C. and it consisted chiefly of the hydrochloride of a monochloro monoamino addition product of dipentene.

Anal.: Calculated for $C_{10}H_{19}NCl_2$: Cl, 31.70; N, 6.25; ionic chlorine, 15.85. Found: Cl, 30.05; N, 7.34; ionic chlorine, 17.81.

Example XVII

Chlorine gas (118 parts, 1.66 mole) was bubbled into a stirred mixture of 18.7 parts (1.8 moles) of styrene and 185 parts (4.5 moles) of acetonitrile at 5–10° C. over a period of 2 hours. The reaction mixture was poured onto ice and allowed to stand 15 hours. Some solid material separated during this time and more was recovered by successively cooling the mixture in an ice bath and the organic phase of it in a carbon dioxide-acetone bath. A total of 93 parts of air dried product was obtained, which after recrystallization from ethyl acetate melted at 103–104° C. This was shown by analysis to be N-(2-chloro-1-phenyl)ethyl acetamide,

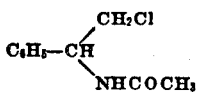

produced by hydrolysis of the intermediate imidochloride, N-(alpha-chloroethylidene)-1-phenyl-2-chloroethylamine.

Anal.: Calculated for $C_{10}H_{12}ONCl$: Cl, 17.97; N, 7.09. Found: Cl, 18.11; N, 6.59.

Fifteen parts of N-(2-chloro-1-phenyl)ethyl acetamide was heated with 18 parts of concentrated hydrochloric acid and 45 parts of water at 100° C. for 24 hours. The mixture was then evaporated to dryness and the final drying achieved by addition of benzene and distillation of a water-benzene binary. The remaining benzene slurry was filtered, giving 13 parts of a tan-colored amine hydrochloride. Recrystallization from a mixture of ethyl acetate and ethanol gave the pure beta-amino-beta-phenylethyl alcohol hydrochloride,

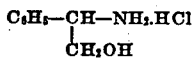

M. P. 132–135° C. This compound appears to decompose at the initial melting point, resolidify and subsequently remelt at 147–149° C. These observations confirm those published by Gabriel and Colman, Ber. 47, 1866.

Anal.: Calculated for $C_8H_{12}ONCl$: Cl, 20.46; N, 8.07. Found: Cl, 20.22; N, 7.95.

Example XVIII

A mixture of 225 parts (2.16 moles) of styrene and 175 parts (6.5 moles) of liquid hydrogen cyanide was treated at 5–10° C. with 142 parts (2 moles) of chlorine over a period of 2 hours. The reaction mixture was kept in contact with water for 15 hours. The product consisted of 60 parts of a styrene polymer containing chlorine and nitrogen, and 18 parts of a tan-colored amine hydrochloride. The latter product was recrystallized from an ethanol-ethyl acetate mixture to give a white solid, M. P. 174–178° C., which was shown by analysis to be alpha-phenyl-beta-chloroethylamine hydrochloride,

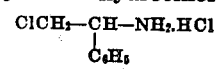

produced by hydrolysis of the intermediate imidochloride of N-(alpha-phenyl-beta-chloro)ethyl formamide.

Anal.: Calculated for $C_8H_{11}NCl_2$: Cl, 36.97; N, 7.30 ionic chlorine, 18.49. Found: Cl, 36.51; N, 7.22; ionic chlorine, 18.16.

Example XIX

A solution of 11.8 parts of 2,5-dihydrothiophene-1,1-dioxide (the addition product of sulfur dioxide to 1,3-butadiene, having the structure

in 41 parts of acetonitrile was treated with chlorine gas, bubbled therethrough in a slow stream at about 20° C., until the solution became light yellow in color. The reaction mixture was cooled in an ice bath and the colorless precipitate which separated was filtered off. There was thus obtained 10.2 parts of product melting at 129–130° C., which upon recrystallization from methanol or benzene gave colorless crystals melting at 136–140° C. Additional product can be obtained by concentration of the acetonitrile filtrate.

The reaction product was shown by analysis to have the composition $C_6H_6O_2NSCl_5$, which indicated that it was the imidochloride, N-[(alpha-chloro - beta,beta,beta - trichloro)ethylidene]-3-chloro -4- aminotetrahydrothiophene-1,1-dioxide, which may alternatively be called 3-chloro-4-(alpha-chloro-beta,beta,beta-trichloro) acetaldiminotetrahydrothiophene-1,1-dioxide, having the formula

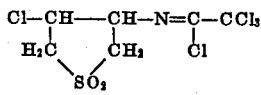

Anal.: Calculated for $C_6H_6O_2NSCl_5$: N, 4.20; S, 9.60; Cl, 53.2. Found: N, 4.30; S, 9.44; Cl, 52.5.

Hydrolysis of the above-described product by treatment with concentrated hydrochloric acid at 100° C. for about 5 hours, followed by cooling and filtering, gave a colorless solid which after recrystallization from benzene melted at 202–205° C. Analysis showed that the hydrolysis product was 3 - chloro-4-(trichloroacetamido) tetrahydrothiophene-1,1-dioxide,

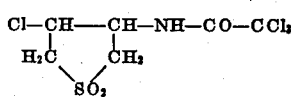

Anal.: Calculated for $C_6H_7O_3NSCl_4$: N, 4.44; S, 10.16; Cl, 45.1. Found: N, 4.29; S, 9.94; Cl, 44.9.

Example XX

Chlorine was passed into 50 parts of acetonitrile cooled in an ice bath until 15.6 parts had dissolved. To this solution was then added a solution of 8.8 parts of 2,5-dihydrothiophene-1,1-dioxide in 18 parts of acetonitrile, whereupon the yellow color of the chlorine solution disappeared in a few minutes. The excess acetonitrile was removed by evaporation and there was recovered 17.6 parts of a colorless crystalline solid. This product was recrystallized from hot methanol and this treatment apparently replaced the labile chlorine atom on the carbon in alpha position to the nitrogen by a methoxy group, since the material analyzed for N-[(alpha-methoxy-beta,beta,di chloro)ethylidene]-3-chloro-4-aminotetrahydrothiophene-1,1-dioxide, which may also be called 3-chloro-4-(alpha-methoxy - beta,beta,dichloro) - acetaldiminotetrahydrothiophene - 1,1 - dioxide, M. P. 158–160° C. This compound has the formula

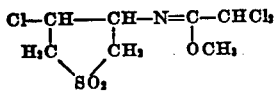

Anal.: Calculated for $C_7H_{10}O_3NSCl_3$: N, 4.75; S, 10.87; Cl, 36.2. Found: N, 4.74; S, 11.8; Cl, 35.8.

Hydrolysis of this product by treatment with nearly boiling water for a few minutes gave a colorless solid melting at 170–173° C., which analysis showed to be 3-chloro-4-(dichloroacetamido)tetrahydrothiophene-1,1-dioxide,

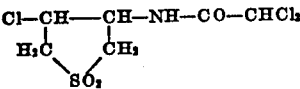

Anal.: Calculated for $C_6H_8O_3NSCl_3$: C, 25.7; H, 2.85; N, 4.99; S, 11.4; Cl, 38.0. Found: C, 25.51; H, 2.85; N, 4.90; S, 11.3; Cl, 37.5.

When the hydrolysis was carried out with a mixture of 3 parts of concentrated hydrochloric acid and one part of water at 100° C. for 2 hours, the product was a colorless solid melting at 218–220° C. which analysis showed to be the hydrochloride of 3 - chloro - 4 - aminotetrahydrothiophene-1,1-dioxide,

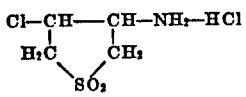

Anal.: Calculated for $C_4H_9O_2NSCl_2$: N, 680; S, 15.54; Cl. 34.45; neutralization equivalent, 206. Found: N, 6.74; S, 15.46; Cl, 34.10; neutralization equivalent, 200.

Example XXI

Bromine (115 parts, 0.72 mole) was added dropwise to a stirred solution of 82 parts (1.0 mole) of cyclohexene in 164 parts (4.0 moles) of acetonitrile at —5° C. over a period of 75 minutes. The reaction mixture was immediately poured onto cracked ice and allowed to stand for 24 hours at room temperature. The resulting mixture was cooled again and filtered. The solid (41.5 parts) was crude N-acetyl-2-bromocyclohexylamine obtained by hydrolysis of the intermediate N-(alpha-bromoethylidene)-2-bromocyclohexylamine, the imidobromide of N-(2-bromocyclohexyl)-acetamide. After recrystallization from ethyl acetate, N-acetyl-2-bromocyclohexylamine was obtained as a white solid melting at 109–110° C.

Anal.: Calculated for $C_8H_{14}ONBr$: Br, 36.34; N, 6.36. Found: Br, 36.54; N, 6.28.

This invention includes as new products the imidochlorides and imidobromides of the general formula

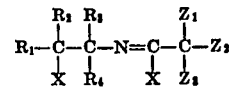

wherein the R's, X's and Z's have the significance herein stated. These imidohalides are heat-stable, distillable liquids which, in addition to their use as intermediates in the preparation of N-acyl-beta-haloamines, are useful per se as pest killers, insecticides, bactericides, and the like. The preferred compounds, because most accessible, are the imidochlorides, in particular those in which at least two of the radicals $R_1$, $R_2$, $R_3$ and $R_4$ are hydrogen and the others are aliphatically saturated hydrocarbon radicals each containing from one to six carbon atoms but having a total of not more than ten carbon atoms, or are methylene radicals joined together with the carbon atoms attached to nitrogen and chlorine to form a 5 to 6 member alicyclic ring. Within this group of preferred compounds are imidochlorides having the following general formula

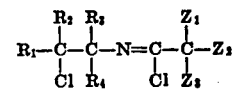

wherein the R's have the significance just stated and the Z's are selected from the class consisting of chlorine, alkyl groups of one to six carbon atoms and chloroalkyl groups of one to six carbon atoms.

Still more preferred are the imidochlorides wherein all the R's are hydrogen, that is, the derivatives of beta-chloroethylamine. Within this group of most preferred imidochlorides are those having the general formula

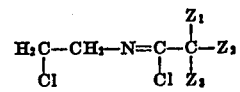

wherein the Z's are chlorine, alkyl of one to six carbon atoms or chloroalkyl of one to six carbon atoms.

In addition to the several imidohalides described in the examples, there may be mentioned, as other members of this class, the imidochlorides of N-(2-chloroethyl)-dimethylchloroacetamide, N - (2 - chloropropyl)methyldibromoacetamide, N - (2 - chlorododecyl) trichloroacetamide, N-(2-chlorocyclohexyl) trimethyl acetamide, N-(2-chloroethyl)-tri(chloromethyl) acetamide, N-(2-chloro-1-phenyl)ethyl trichloroacetamide, N - (2 - chlorobutyl) cyclohexyldibromoacetamide, N-(2-chloroethyl) hexyldimethylacetamide, N - (2 - chloroethyl) - 1-methylcyclohexanecarbonamide; N-[(2-chloro-2,2-dimethyl-1,1 - dimethyl) ethyl]trichloroacetamide, N - (2-bromobutyl) -cyclopentyldimethylacetamide, N-[(2 - chloro-1-naphthyl) - ethyl]chlorohexyldimethylacetamide, N-(2-chloroethyl) tri - (cyclohexyl)acetamide; the imidobromides of N-(2-bromoethyl)-tri(bromomethyl)acetamide, N-(2-bromopropyl)tributylacetamide, N - (2 - bromocyclopentyl) tribromoacetamide, and the like.

In the process of this invention there may be used any ethylenically unsaturated hydrocarbon having from 2 to 12 carbon atoms. In addition to the unsaturates used in the examples, other suitable unsaturates include propylene, butene-1, the amylenes, hexene-1, dodecene-1, cyclopentene, cyclopentadiene, allybenzene, vinylnaphthalene, etc. The reaction is also operable with unsaturates which, in addition to carbon and hydrogen, contain inert groups such as the sulfo group. The process is more clean-cut and gives better yields with hydrocarbons containing as the sole aliphatic unsaturation one ethylenic double bond, and these are therefore the preferred materials. However, the hydrocarbons may contain two ethylenic double bonds as shown in Examples VII and XVI. A still more preferred class is that of the alkenes and cycloalkenes having from 2 to 12 carbon atoms.

Any nitrile, including hydrogen cyanide (formonitrile), is suitable for use in the process of this invention, including, in addition to the nitriles used in the examples, propionitrile, butyronitrile, capronitrile, heptanonitrile, dodecanonitrile, stearonitrile, olenitrile, cyclohexane carbonitrile, naphthonitrile, chloroacetonitrile, trichloroacetonitrile, carbethoxyacetonitrile, succinonitrile, adiponitrile and the like. The preferred nitriles are the mononitriles containing only carbon and hydrogen in addition to the nitrile nitrogen, in particular those containing from two to twelve carbon atoms. The most useful mononitriles are the alkanenitriles of two to twelve carbon atoms.

The halogenation of ethylenic compounds in the presence of a nitrile can be carried out under a fairly wide variety of conditions. To obtain satisfactory yields it is desirable to use at least one mole of nitrile per mole of ethylenic compound, and there may be used as much as 20 or 30 moles or even more although it is uneconomical to use such an excess of nitrile. The ethylenic compound need not be completely dissolved in the nitrile, although this is preferable. If desired, an inert auxiliary solvent such as carbon tetrachloride or chloroform may be used. The halogen (bromine or chlorine) can be added to the mixture of nitrile and ethylenic compound, or the latter can be treated with a solution of halogen in the nitrile. If an excess of halogen is used, substitution reactions may take place, involving in particular the imidohalide portion of the molecule. Such reactions can in general be avoided, if desired, by operating with a slight excess of unsaturated compound.

The halogenation reaction proceeds in general very well in the cold, e. g., at temperatures between —50 and +20° C., but higher temperatures, e. g., up to 100° C. or more may be used. At high temperatures substitution reactions may tend to be excessive. The course of the halogenation can easily be followed either through tests for residual free halogen or by periodic examination of a sample of the reaction product. The best results are obtained when the molar amount of halogen used is approximately equivalent to or higher than that of the unsaturate, e. g., between 0.7 and 3.0 moles of halogen per mole of unsaturate, but there may be used if desired as low as 0.25 mole of halogen per mole of unsaturate and as high as 5 moles or even more. The halogen preferably used is, of course, chlorine.

The primary reaction product, i. e., the imidohalide, may be isolated by any convenient means, such as by crystallization from the reaction mixture or evaporation of the excess solvent and/or distillation. When it is to be used as intermediate for the preparation of amides or amines it need not be purified.

Hydrolysis of the imidohalides leads either to the corresponding amides or amines, depending on the stability of the starting material and on the severity of the hydrolysis conditions. Neutral or acidic hydrolysis conditions should be used to obtain the amides and beta-haloamines since they are unstable under alkaline conditions. Hydrolysis is suitably carried out with water alone, e. g., at temperatures between 0° C. and 100° C., or with dilute or concentrated acids such as hydrochloric or sulfuric acid, if desired, at elevated temperatures up to 100° C. or higher (in closed vessels). The hydrolysis products may be purified by recrystallization from suitable solvents, or from water in the case of the beta-haloamine hydrohalides.

The invention provides an economical and rapid method of arriving, through the intermediate imidohalides, at halogenated amides and amines which are useful as insecticides, plasticizers, etc., and as intermediates for numerous chemical syntheses.

As many apparently widely different embodiments of this invention may be made without departing from the spirit and scope thereof it is to be understood that this invention is not limited to the specific embodiments thereof except as defined in the appended claims.

I claim:

1. An imidochloride of an N-acyl-beta-chloroamine having the following general formula

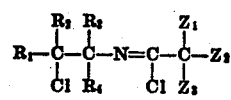

wherein $R_1$, $R_2$, $R_3$ and $R_4$ are members of the group consisting of hydrogen, phenyl, alkyl radicals of from 1 to 6 carbon atoms, and methylene radicals joined together with the carbon atoms attached to nitrogen and chlorine to form a 5 to 6 membered alicyclic ring, at least two of said members $R_1$, $R_2$, $R_3$ and $R_4$ being hydrogen, the total number of carbon atoms in said members $R_1$, $R_2$, $R_3$ and $R_4$ not exceeding ten, and $Z_1$, $Z_2$ and $Z_3$ are members of the group consisting of chlorine, alkyl of 1 to 6 carbon atoms and chloromethyl.

2. N - [(alpha - chloro - beta,beta,beta - trichloro)-ethylidene]-beta-chloroethylamine.

3. A process for the preparation of an imidohalide of an N-acyl-beta-haloamine which comprises halogenating at a temperature of —50° to 100° C. ethylenically unsaturated hydrocarbon containing from 2 to 12 carbon atoms with a halogen having an atomic number of 17 to 35 in contact with a nitrile which is present in an amount of at least one mole per mole of said ethylenically unsaturated compound.

4. A process which comprises halogenating at a temperature of —50° to 100° C. an ethylenically unsaturated hydrocarbon containing from 2 to 12 carbon atoms with a halogen having an atomic number of 17 to 35 in contact with a nitrile which is present in an amount of at least one mole per mole of said ethylenically unsaturated compound and hydrolyzing under neutral to acidic conditions the resulting imidohalide.

5. A process for the preparation of an imidochloride of an N-acyl-beta-chloroamine which comprises halogenating at a temperature of —50° to 100° C. an ethylenically unsaturated hydrocarbon containing from 2 to 12 carbon atoms with chlorine in contact with a nitrile containing only carbon and hydrogen in addition to the nitrile nitrogen, said nitrile being present in an amount of at least one mole per mole of said ethylenically unsaturated compound.

6. A process which comprises halogenating at a temperature of $-50°$ to $100°$ C. an ethylenically unsaturated hydrocarbon containing from 2 to 12 carbon atoms with chlorine in contact with a nitrile containing only carbon and hydrogen in addition to the nitrile nitrogen, said nitrile being present in an amount of at least one mole per mole of said ethylenically unsaturated compound and hydrolyzing under neutral to acidic conditions the resulting imidochloride.

7. A process for the preparation of an imidochloride of an N-acyl-beta-chloroamine which comprises halogenating at a temperature of $-50°$ to $100°$ C. an ethylenically unsaturated hydrocarbon containing from 2 to 12 carbon atoms with chlorine in contact with a mononitrile containing only carbon and hydrogen in addition to the nitrile nitrogen, said nitrile being present in an amount of at least one mole per mole of said ethylenically unsaturated compound.

8. A process for the preparation of an imidochloride of an N-acyl-beta-chloroamine which comprises halogenating at a temperature of $-50°$ to $100°$ C. an ethylenically unsaturated hydrocarbon containing from 2 to 12 carbon atoms with chlorine in contact with acetonitrile which is present in an amount of at least one mole per mole of said ethylenically unsaturated compound.

9. A process for the preparation of an imidochloride of an N-acyl-beta-chloroamine which comprises halogenating at a temperature of $-50°$ to $100°$ C. ethylene with chlorine in contact with acetonitrile which is present in an amount of at least one mole per mole of said ethylene.

PAUL L. BARRICK.

No references cited.